United States Patent [19]

Taylor

[11] 3,873,762

[45] Mar. 25, 1975

[54] SPRING LOADED STYLUS ARM PIVOT

[75] Inventor: Byron Kent Taylor, Indianapolis, Ind.

[73] Assignee: RCA Corporation, New York, N.Y.

[22] Filed: Oct. 1, 1973

[21] Appl. No.: 402,411

[30] Foreign Application Priority Data

Mar. 26, 1973 United Kingdom .............. 14393/73

[52] U.S. Cl. ........... 178/6.6 A, 274/23 R, 274/23 A

[51] Int. Cl. ........................... H04n 5/82, G11b 3/10

[58] Field of Search ........... 178/6.6 A; 179/100.4 R; 274/23 A, 37, 23 R

[56] References Cited

UNITED STATES PATENTS

| | | | |
|---|---|---|---|
| 2,869,877 | 1/1959 | Bard | 274/23 A |
| 3,356,372 | 12/1967 | Rabinow | 274/23 A |
| 3,711,641 | 1/1973 | Palmer | 360/73 |
| 3,767,848 | 10/1973 | Schuller et al. | 179/100.4 R |

*Primary Examiner*—Bernard Konick
*Assistant Examiner*—David K. Moore
*Attorney, Agent, or Firm*—Eugene M. Whitacre; William H. Meagher

[57] ABSTRACT

For a video disc system wherein information is recorded in a smooth spiral groove on the surface of a disc and wherein the recorded information is recovered by a stylus riding in the groove when relative motion is established between the stylus and the disc, a spring loaded stylus arm pivot coupling is provided. The spring loaded stylus arm pivot coupled comprises a plug having a circular cross-section and a support member having an opening with dimensions permitting only a partial entry of and presenting annular surfaces for smooth engagement with the plug. The dimension of the opening in the direction tangential to the groove at the point of engagement of the stylus with the groove, is spring loaded to permit the plug to rock freely toward and away from the disc to accommodate disc surface undulations while at the same time the annular surfaces of the opening remain in continuous engagement with the peripheral surfaces of the plug. The plug is attached to the stylus arm and the support member is attached to the stylus arm carrying structure. The stylus is attached to a flattened free end of the conductive stylus arm, the flattened end augmenting the vertical compliance of the stylus arm assembly, while providing a conductive connection between the conductive surface of the stylus and the remaining length of the stylus arm.

8 Claims, 11 Drawing Figures

SPRING LOADED STYLUS ARM PIVOT

BACKGROUND OF THE INVENTION

This invention pertains to a spring loaded stylus arm pivot coupling compatible with the electronic and mechanic requirements of a video disc system.

In certain video disc systems, video information is recorded by means of geometric variations in the bottom of a smooth spiral groove on the surface of a disc. The disc surface includes a layer of conductive material which is preferably covered with a thin coating of dielectric material. A stylus engages the spiral groove and includes a conductive surface which, together with the conductive material and the dielectric coating of the disc, form a capacitor. When the disc is rotated, an edge of the conductive surface of the stylus, while riding in the disc groove, recovers capacitive variations due to the geometric variations in the bottom of the spiral groove. The capacitive variations which represent recorded video information are processed and applied to a conventional television receiver for reproduction. The variable capacitor concept is described in detail in the copending U.S. Patent application, Ser. No. 126,772, filed Mar. 22, 1971, for J. K. Clemens, entitled "Information Records and Recording/Playback Systems Therefor," also assigned to the present assignee and now U.S. Pat. No. 3,842,194.

The stylus including the conductive surface is attached to the free end of a stylus arm. The stylus arm is freely pivoted at its other end on a support member attached to a stylus arm carrying structure. The stylus arm carrying structure desirably incorporates a suitable feed drive mechanism for driving the stylus arm assembly transversely across te disc in proper time relationship with the rotational speed of the disc whereby the attitude of the stylus conductive surface in the groove may be held relatively constant.

In video disc systems of the aforementioned Clemens' type (U.S. Patent application, Ser. No. 126,772, now U.S. Pat. No. 3,842,194) it is desirable to maintain the relative motion between the disc and the stylus at a predetermined speed (e.g. 450 rpm) to obtain accurate reproduction of the recorded information. Although precise design and manufacture of the disc and playback apparatus minimize the speed errors, random cyclical errors sufficient to noticeably affect the picture quality (e.g. by causing jitter) will remain. Cyclical speed errors emanate from several sources. For example, disc and turntable eccentricities, and disc manufacturing defects, to name a few. Errors caused by the aforementioned sources appear at the stylus once every revolution. By way of example, speed errors caused by the disc mounting eccentricity will occur at a frequency of 7.5 Hz (at disc rotational speed of 450 rpm). Speed errors caused by two disc manufacturing defects per groove (e.g. two scratches) will repeat at a frequency of 15 Hz (at disc rotational speed of 450 rpm), and so on. In U.S. Pat. No. 3,711,641, issued to R. C. Palmer on Jan. 16, 1973, entitled "Velocity Adjusting System," a system is disclosed for compensating cyclical speed errors by varying the position of the stylus in the groove in a direction tangential to the groove at the point of engagement of the stylus with the groove. This is accomplished by providing a support member for the stylus arm pivot, which is rendered subject to a correcting motion in response to cyclical speed errors. For satisfactory operation of the velocity adjusting system of the above type, the motion imparted to the support member of the stylus arm pivot assembly must be transmitted to the stylus substantially with minimum phase lag at the error frequencies. Therefore, it is desirable that the coupling between the stylus and the support member be relatively stiff in a direction tangential to the groove at the point of engagement.

The cyclical motion imparted to the stylus arm pivot by the velocity adjusting system results in wear and tear of the mating pivotal surfaces, thereby injecting a backlash component in the transmitted motion. Therefore, it is desirable that the pivot coupling be self-adjusting to compensate for the wear and tear of the mating surfaces.

In video disc systems adequate bandwidth for monochrome and color display is obtained by rotating the disc at a speed substantially higher (e.g. 450 rpm) than conventional audio playback speeds (e.g. 33 and one-third rpm). For a given number of imperfections per groove, the higher the speed of rotation, the higher would be the frequency of disturbances with which the stylus arm assembly must cope for accurate tracking. These disturbances are mainly in two directions perpendicular to a direction tangential to the groove at the point of engagement. Therefore relatively high speeds employed in video disc systems make a sensitive stylus arm assembly desirable.

Playing time of a disc is a function of groove density (grooves per inch) and the rotational speed of the disc. For a given rotational speed of the disc, higher playing time can be obtained by packing more grooves per inch. Use of a high groove density results in narrow grooves. The tendency of the stylus arm assembly to skip and skate across the grooves on the disc increases with narrowness of the grooves. For a given width of the grooves the tendency of the stylus arm assembly to skip and skate can be decreased by reducing the torsional resistance offered by the pivot. A high rotational speed and a high groove density used in video disc systems make a low torsional resistance pivot desirable.

It is desirable in order to facilitate inspection or replacement of the stylus, that the stylus arm pivot arrangement permit substantially instantaneous removal of the stylus arm from the stylus arm carrying structure without requirements for complicated manual disconnecting of the components. It is also desirable that the arrangement permit easy drop in re-engagement into proper operative position by an untrained user in the manner that minimizes the likelihood of a misalignment which could degrade the performance of the playback system.

It is advantageous to provide a stylus arm pivot assembly which permits standardization and modular construction compatible with low cost mass production processes.

In a video disc system wherein information is recorded in a smooth spiral groove on the surface of a disc and wherein the recorded information is recovered by a stylus riding in the groove when relative motion is established between the stylus and the disc, in accordance with the principles of this invention, a spring loaded stylus arm pivot coupling is provided. A plug having a substantially circular cross-section is attached to the pivoted end of a stylus arm. The plug is received by a support member in an opening having dimensions permitting only a partial entry of and presenting annular surfaces for smooth engagement with the plug. The dimension of the opening in the direction tangential to the groove at the point of engagement of the stylus with the groove, is spring loaded to permit the plug and stylus arm to rock freely toward and away from the disc to accommodate disc surface undulations while at the same time the annular surfaces of the opening remain in continuous engagement with the peripheral surfaces of the plug. The support member is attached to the stylus arm carrying structure linked to the motorboard of a video disc system.

Pursuant to a further feature of the present invention, a tubular member of conductive material may desirably be employed as the stylus arm, with the free end of the stylus arm flattened to augment the vertical compliance of the stylus arm assembly, while providing a conductive connection between a conductive surface of the stylus and the remainder of the stylus arm.

The objects and advantages of the present invention will be recognized by those skilled in the art upon a reading of the following detailed description and an inspection of the accompanying drawings in which.

Figure 1:
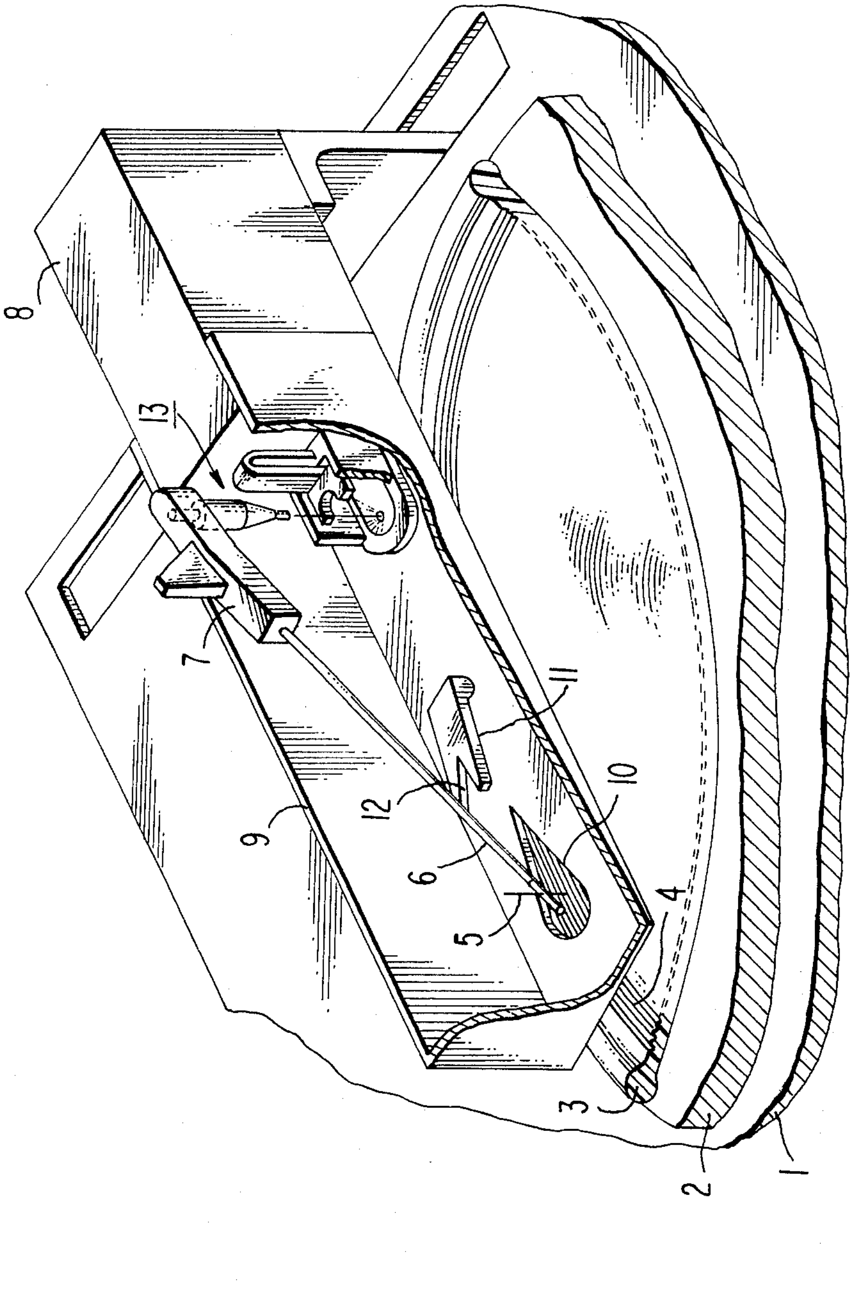
FIG. 1 is a partially cut-away perspective view of a video disc system incorporating an embodiment of the present invention and illustrating the stylus arm assembly disengaged from its carrying structure.
Figures 2, 3:
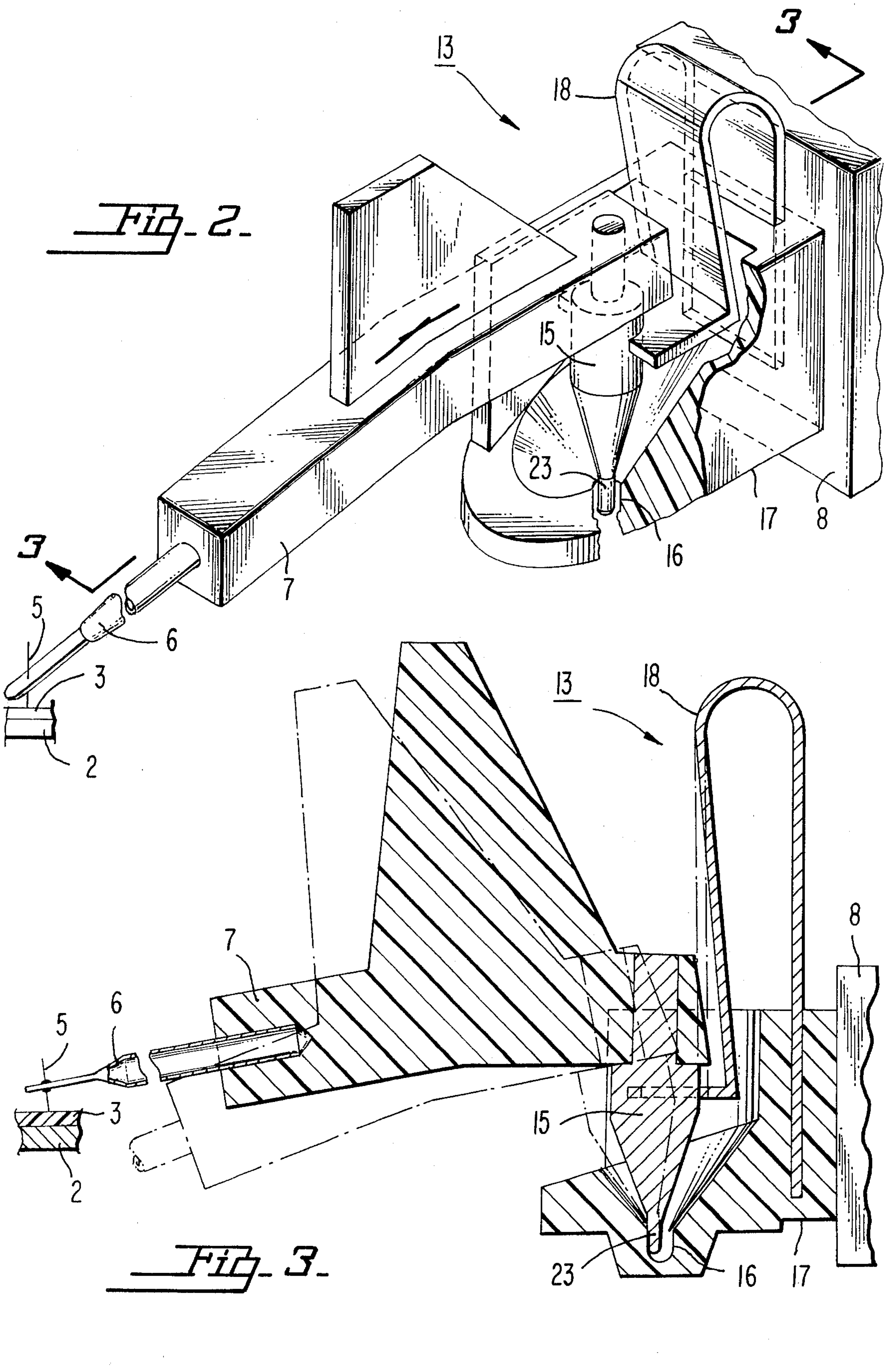
FIG. 2 is a partially cut-away perspective view of one embodiment of the spring loaded stylus arm pivot coupling of FIG. 1.
FIG. 3 is a partially sectioned view of the spring loaded stylus arm pivot coupling taken along line 3—3 of FIG. 2.
Figures 4, 5A, 5B, 5C, 6A, 6B, 6C:
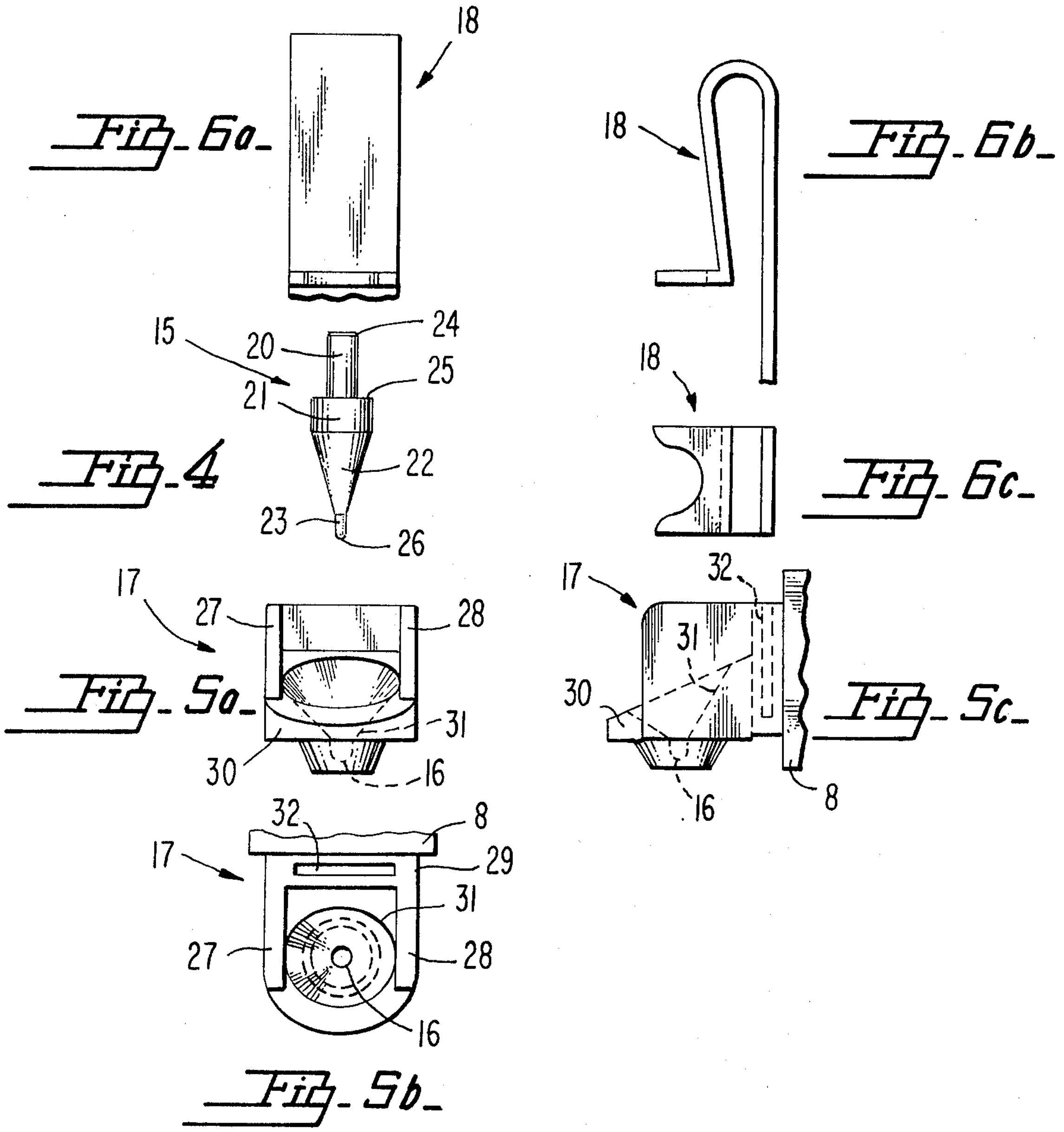
FIG. 4 illustrates an elevation of a plug suitable for use in the spring loaded stylus arm pivot coupling of FIGS. 1, 2, and 3.
Figure 7:
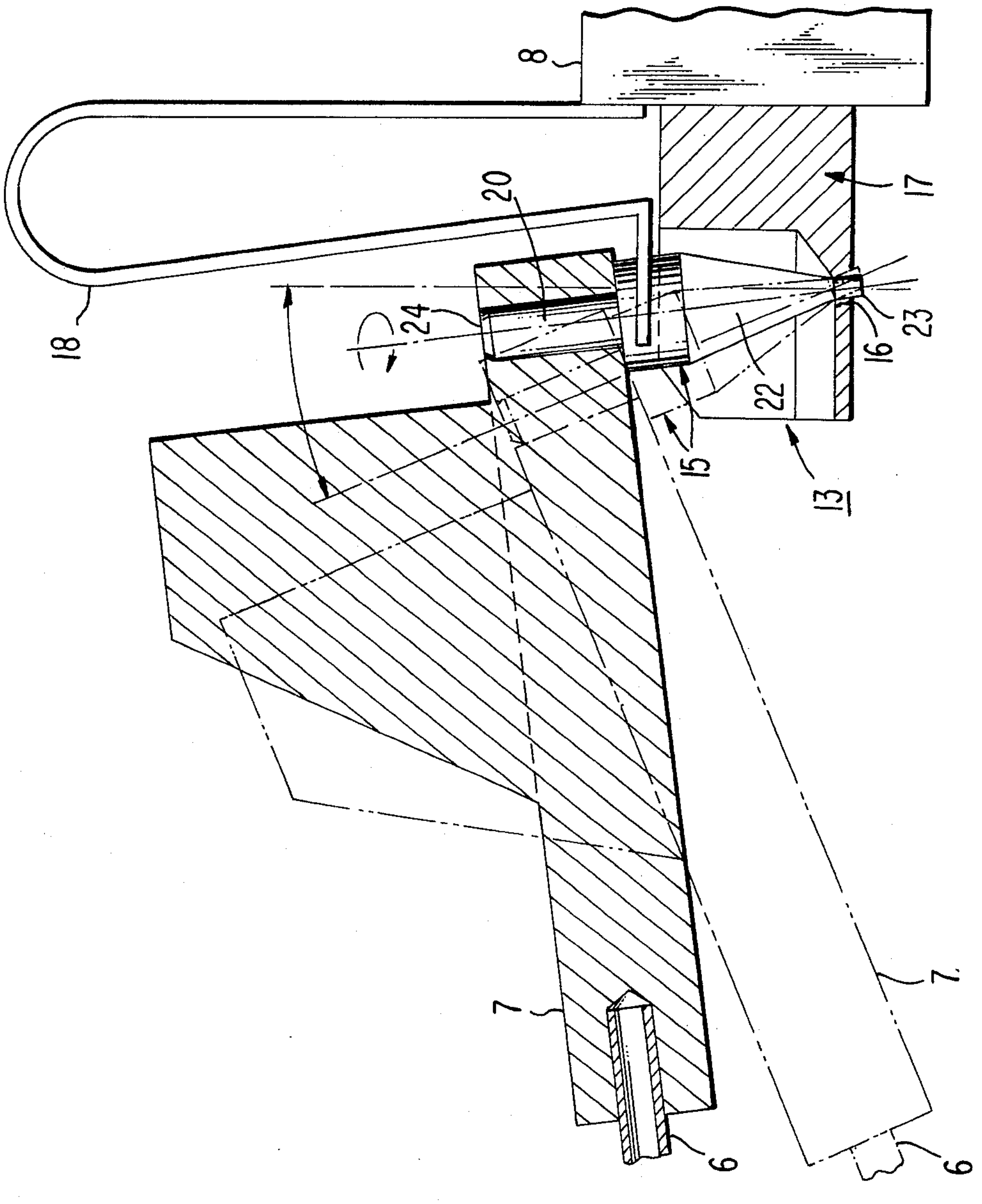

FIGS. 5(*a*), 5(*b*), and 5(*c*) illustrate an elevation, a plan view, and an end view, respectively, of a stylus arm support member suitable for use in the spring loaded stylus arm pivot coupling of FIGS. 1, 2, and 3; and FIGS. 6(*a*), 6(*b*), and 6(*c*) illustrate an elevation, an end view, and a plan view, respectively, of a spring member suitable for use in the spring loaded stylus arm pivot assembly of FIGS. 1, 2, and 3; and FIG. 7 illustrates a partially sectioned view of another embodiment of the spring loaded stylus arm pivot coupling.

DESCRIPTION OF THE INVENTION

FIG. 1 illustrates a portion of an assembly comprising a motorboard 1 having a turntable 2 rotatably mounted thereon. The assembly is suitable for use in a video disc system such as disclosed in the aforementioned copending Clemens' application (U.S. Pat. application, Ser. No. 126,772, now U.S. Pat. 3,842,194). The surface of the turntable 2 is adapted to support a disc 3. A motor and a suitable engaging mechanism (not shown) drives the turntable 2 at a predetermined speed when the player is operative. The rotational motion of the turntable 2 is transmitted to the disc 3 via frictional contact between the turntable 2 and the disc 3. Video information is contained in geometric variations in the bottom of a smooth spiral groove 4 on the surface of the disc 3. The disc surface includes a layer of conductive material which is preferably covered with a thin coating of dielectric material. A stylus 5, subject to positioning in the groove 4, includes a conductive surface which, together with the conductive material and dielectric coating of the disc, form a capacitor. When relative motion is established between the stylus 5 and the disc 3, an edge of the conductive surface included in the stylus 5, while riding in the groove 4, recovers capacitive variations due to the geometric variations in the bottom of the spiral groove. The capacitive variations are transmitted via the conductive surface of the stylus 5 and a conductive stylus arm 6 to a suitable signal processing means. The details of the conductive joint between the stylus 5 and the stylus arm 6 will be described later in conjunction with FIGS. 2 and 3. The output of the signal processing means is coupled to a conventional television receiver for reproduction.

The other end of the stylus arm 6 is permanently inserted into a stylus arm holder 7. The stylus arm holder 7 is flexibly coupled to a stylus arm carrying structure by a spring loaded pivot coupling 13 (described later) incorporating the principles of the present invention.

The stylus arm carrying structure comprises a velocity adjusting system 8 mounted on a transverse feed drive mechanism. The transverse feed drive mechanism causes the velocity adjusting system 8 carrying the stylus arm assembly to transverse radially inward towards the center of rotation of the disc. The transverse motion of the stylus arm assembly provides approximate lateral tracking of the stylus 5 in the groove 4 in proper time relationship with the rotation of the disc. Any discrepancy in the lateral tracking is compensated by the lateral movement of the stylus arm 6 at the pivot coupling 13. In video disc systems, the fragile walls of relatively narrow grooves of the disc cannot be dependably relied upon to pull the stylus arm assembly around the pivot across the entire recorded surface of the disc. Also in video systems utilizing variable capacitor concept, it is desirable for accurate reproduction that the conductive surface included in the stylus 5 maintain a substantially constant attitude toward the groove. The transverse feed drive mechanism satisfies the above requirements by traversing the pivoted end of the stylus arm 6 in proper time relationship with the stylus end engaged in the groove 4 so as to continuously maintain the longitudinal axis of the stylus arm substantially tangential to the groove at the point of engagement.

Illustratively, velocity adjusting system 8 may be of the type disclosed in U.S. Pat. No. 3,711,641, issued to R. C. Palmer on Jan. 16, 1973, entitled "Velocity Adjusting System." In the Palmer system the cyclical speed errors in the relative speed between the disc 3 and the stylus 5 are compensated by varying the position of the stylus in relation to the disc. Circuit means provide an error signal representative of deviation of the instantaneous speed from the predetermined speed. Transducer means reponsive to the error signal, impart motion to the stylus arm pivot coupling 13 in a manner that minimizes the speed error.

A box-like shield enclosure 9, attached to the velocity adjusting system 8, houses the stylus arm assembly. In the operative position the stylus arm 6 protrudes through an aperture 10 in the bottom of the shield enclosure 9 permitting the stylus 5 to ride in the groove 4 of the disc 3. In the inoperative position, a pivotally mounted stylus arm centering ramp 11 sustains the free end of the stylus arm 6. As the stylus arm 6 is lifted out of engagement by the centering ramp 11, which may be manually or automatically actuated, the V-shaped slot 12 provided in the centering ramp permits the stylus arm to gravitate to the center of the ramp. As the stylus arm 6 is lowered for playback, the V-shaped slot 12 causes the stylus 5 to descend substantially centrally for smooth engagement with the spiral groove 4 in a manner that minimizes the likelihood of misalignment. It is noted that in the operative position the centering ramp 11 is out of contact with the stylus arm 6 to permit free pivotal movement of the stylus arm.

As illustrated in FIGS. 2 and 3 in the preferred embodiment of the present invention, the spring loaded stylus arm pivot coupling 13 comprises a plug 15 inserted at one end permanently in the stylus arm holder 7. The plug 15 is received at the other end in a closed-ended opening 16 disposed in a support member 17. The diameter of the opening 16 is slightly greater (illustratively, 0.004inch) than the diameter of the corresponding portion of the plug 15. A generally U-shaped spring member 18, made of suitable flat resilient material, has one leg inserted permanently in the support member 17. The other leg of the spring member 18, preferably shaped with a radius which complements that of coordinate surface of the plug 15, continuously urges the plug and the stylus arm 6 (carrying the stylus) toward the disc surface. The moment exerted by the spring member 18 on the stylus arm 6 pivoted in the opening 16, is balanced by an equal and opposite moment exerted by, (1), the disc 3 when the player is operative and by, (2), the ramp 11 when the player is inoperative. The diameter of the cut-away sector in the spring 18 is slightly greater (illustratively, 0.002inch) than the diameter of the corresponding portion of the plug 15. The tipping of the stylus arm 6 around an imaginary axis formed by a straight line joining the center of the opening 16 and the stylus tip, is prevented by two parallel guiding walls provided in the support member 17 inside surfaces of which guiding walls are in smooth sliding engagement with the outside edges of the spring 18. The guiding walls are separated by a distance slightly greater (illustratively, 0.002inch) than the width of the spring 18. The support member 17 is attached to a movable member of the velocity adjusting system 8 mounted on the transverse speed drive mechanism.

FIGS. 2 and 3 further illustrate the details on the conductive joint between the stylus 5 and the stylus arm 6. The stylus 5 is inserted in an aperture provided in the flattened end of the stylus arm 6 and then the assembly is soldered together at the joint. As indicated before, it is desirable for accurate reproduction of recorded signals that the stylus arm assembly, first, be compliant in two directions perpendicular to a direction tangential to the groove at the point of engagement, and second, at the same time be relatively stiff in a direction tangential to the groove at the point of engagement. The falttened end arrangement of the stylus arm increases the compliance of the stylus arm assembly in a direction substantially normal to the disc surface and simultaneously permits a design which can be relatively stiff in a direction tangential to the groove at the point of engagement. The flattened end of the stylus arm 6 performs these mechanical functions, while additionally serving to provide a conductive connection between the conductive surface of the stylus 5 and the remaining length of the conductive stylus arm. The provision of such a connection is of importance where the stylus arm serves not only the mechanical purpose of appropriate stylus support but additionally serves an electrical purpose as the inner conductor of a transmission line, as in video disc pickup assemblies of the type shown in the copending application, Ser. No. 295,854, of Stephen E. Hilliker, filed on Oct. 10, 1972.

As illustrated in FIG. 4, the plug 15 comprises a pin 20, a shank 21, a conical segment 22, and a cylindrical portion 23. The chamfered end 24 of the pin 20 facilitates entry of the pin into an aperture provided in the arm holder 7. The pin 20 is press fitted into the aperture provided in the stylus arm holder 7 in such a way as not to allow any relative motion between the plug 15 and the stylus arm holder. A shoulder portion 25 of the shank 21 is in contact with the surface of the stylus arm holder 7 through which the pin 20 is inserted. The cylindrical portion 23 has a substantially hemispherical tip 26 which smoothly rests in the closed-ended opening 16.

FIGS. 5(*a*), 5(*b*), and 5(*c*) illustrate an elevation, a plan view, and an end view, respectively, of the support member 17. The support member 17 includes two parallel guiding walls 27 and 28, a backwall 29 and a lower wall 30. The lower wall 30 has a V-shaped conical recess 31 which merges into the opening 16. The opening 16 is closed-ended and has a substantially hemispherical bottom surface. The tip 26 of the plug 15 smoothly rests on the hemispherical bottom surface of the opening 16. The backwall 29 is attached to the movable member of the velocity adjusting system 8. The backwall 29 has a slot into which one leg of the U-shaped spring member 18 is permanently inserted. The inside surfaces of the parallel guiding walls 27 and 28 are spaced at a distance slightly greater (illustratively, 0.002inch) than the width of the spring with which they are in sliding engagement. The guide walls 27 and 28 allow lateral motion (parallel to the surface of the disc) of the stylus arm 6 by not obstructing the rotational movement of the plug 15 in the opening 16. Also the guide walls 27 and 28 permit vertical motion (toward and away from the surface of the disc) of the stylus arm 6 as the plug 15 is allowed to rock freely in the spring loaded opening 16 in the support member 17. The guide walls 27 and 28, however, prevent tipping of the stylus arm 6 around an imaginary axis formed by the center of the opening 16 and the stylus tip. This anti-tipping feature enables the conductive surface included in the stylus to maintain a substantially constant attitude in the groove which is desirable for accurate reproduction of the recorded signals.

FIGS. 6(*a*), 6(*b*), and 6(*c*) illustrate an elevation, an end view and a plan view, respectively, of a generally U-shaped spring member 18. One leg of the spring member 18 is permanently inserted into the slot 32 provided in the backwall 29 of the support member 17. The other leg of the spring member 18, preferably shaped with a radius which compliments that of coordinate surface of the plug 15, continuously urges the plug and the stylus arm 6 toward the disc surface. The spring accomplishes primarily three functions. First, it provides a tracking force between the stylus and the groove without adding mass to the stylus arm. Second, it provides relatively flexible and firm support to the plug (and thereby the stylus arm assembly) by consuming the slack (illustratively, 0.004inch) between the plug 15 and the support member 17. The slack between the cylindrical portion 23 and the opening 16 is built-in, (1), to allow free lateral and vertical motion of the stylus arm 6 by virtue of the rotational and rocking motion respectively of the plug 15, and (2), to permit an easy relatively instantaneous drop in re-engagement of the plug with the support member 17 in proper operating mode. Also certain additional slack will result as the mating surfaces wear during normal use of the playback apparatus. Third, the spring permits free rocking motion of the plug 15 and the stylus arm 6 toward and away from the disc to accommodate disc surface defects (such as pinch, warp, etc.) without introducing phase lag or delay in the correcting motion imparted by the velocity adjusting system 8 to the stylus 5 via the support member 17. When the plug 15 rocks to cope with the disc surface undulations, the horizontal projection of the mating surfaces of the plug continuously changes which needs accommodation if the correcting motion is to be transmitted by the support member 17 without phase lag. The spring 18 having its sensitive axis parallel to the direction in which the correcting motion is transmitted (along a line tangential to the groove at the point of engagement of the stylus with the disc) meets the above requirements satisfactorily.

FIG. 7 illustrates a partially sectioned view of another embodiment of the spring loaded stylus arm pivot coupling. In FIG. 7 like reference characters are used to designate like or corresponding parts shown in FIGS. 1 through 6. The embodiment of FIG. 7 differs primarily from the embodiment of FIG. 2 in the following respects. First, in the embodiment of FIG. 2, the plug 15 is inserted into the "closed" opening 16, while in the embodiment of FIG. 7, the plug 15 is inserted into a "through" opening 16 whereby the peripheral surfaces of the conical segment 22 are engaged by the annular surfaces of the opening. It was found that in the embodiment of FIG. 7, the plug 15 has a tendency to "lock-up" or "jam" into the opening 16, which in turn reduced the ability of the stylus arm 6 (and therefore the stylus 5) to comply faithfilly with the disc surface undulations. The reduced compliance of the stylus arm 6 adversely affected the performance of the playback apparatus. The embodiment of FIG. 2 has overcome the "lock-up" problem improving the performance of the playback apparatus. Second, the stylus arm holder of FIG. 2 is bent so as to keep the axis of the plug 15 substantially coincident with the axis of the opening 16 to minimize groove skipping and skating. The embodiment of FIG. 7 does not offer such a feature. Third, in the embodiment of FIG. 2, one leg of the spring member 18 is inserted into a slot provided in the support member 17 which in turn is attached to the movable member of the velocity adjusting system 8. In the embodiment of FIG. 7, the aforementioned leg of the spring member 18 is attached directly to the movable member of the velocity adjusting system 8. The embodiment of FIG. 2 simplifies manufacturing and assembly tasks of the stylus arm pivot coupled as compared to the embodiment of FIG. 7.

Both illustrated embodiments of the invention have a number of advantages as delineated in the following summary.

The weight distribution and the geometry of the stylus arm assembly is such that in the operative position the line joining the center of gravity of the stylus arm assembly and the pivotal center, i.e., the center of the opening 16, is substantially parallel to the direction of motion imparted to the stylus arm assembly by the velocity adjusting system 8. This feature prevents the plug 15 attached to the stylus arm from being jerked out of the support member 17 which may cause damage to the disc and the stylus.

As indicated, for satisfactory operation of the velocity adjusting system 8 the motion imparted to the support member 17 of the stylus arm pivot must be transmitted with minimum phase lag to the stylus 5 at error frequencies. As shown in FIG. 3, the motion is transmitted by the velocity adjusting system 8 to the support member 17. The annular surfaces of the opening in the support member 17 continuously engage the periphery of the plug 15 and hence the motion is imparted to the plug with minimum phase lag. The motion of the plug is transmitted to the stylus 5 via the stylus arm holder 7 and the stylus arm 6.

The self-adjusting feature of the stylus arm pivot coupling is by virtue of the fact that as the mating pivotal surfaces wear out, the cylindrical tip 26 of the plug 15 automatically sinks further into the opening 16 and consumes slack. Thus it will be seen that after initial setting of the stylus arm assembly in proper operative position no subsequent readjustments are necessary.

The stylus arm pivot coupling provides an arrangement which is compliant in the two directions perpendicular to a direction tangential to the groove at the point of engagement and relatively stiff in the direction tangential to the groove at the point of engagement. The low mass stylus arm assembly is sensitive to the imperfections (both vertical and lateral) in the disc surface such as warps and eccentricities. As the pivot offers a low torsional resistance, the tendency of the stylus arm assembly to skip and skate is reduced. The mechanism is self-adjusting and its simple construction is compatible with low cost mass production processes.

What is claimed is:

1. In a video disc playback system including a board, a turntable mounted for rotation relative to said board and having a surface adapted to receive a disc having a spiral groove with information recorded therein, a stylus subject to positioning in said spiral groove for recovering said information, a stylus arm carrying said stylus, and a stylus arm carrying structure subject to motion relative to said board during disc playback in a direction substantially parallel to said turntable surface and oriented to permit movement of said stylus arm in a direction effectively tangential to said spiral groove at the point of engagement of said stylus with said groove to reduce errors in the relative stylus/groove velocity; a spring loaded stylus arm pivot coupling comprising:

a plug having one end attached to said stylus arm and having a substantially circular cross-section in a region remote from said one end;

a support member attached to said stylus arm carrying structure in such manner as to participate in said motion thereof, said support member having an opening with dimensions permitting only a partial entry of said plug and presenting annular surfaces for smooth engagement with a surface of said plug in said remote region; the dimensions of the engaging surfaces of said opening and said remote plug region differing sufficiently to permit a rocking movement of said plug in said opening, when received therein, in a direction providing rotation of said stylus arm about an axis parallel to said turntable surface and substantially perpendicular to the direction of motion of said support member; and means for spring loading said plug in said opening in said direction tangential to said groove at the point of engagement of said stylus with said groove so as to effect transmission of said motion of said support member to said stylus arm without significant lag while permitting said rocking movement of said plug to accommodate disc surface undulations during playback;

said spring loading means comprising a spring having a first end supported by said stylus arm carrying structure, and a second end presenting an arcuate surface for engagement with a surface of said plug.

2. A system as defined in claim 1 wherein said stylus arm is angularly oriented during playback relative to said direction of spring loading such that a force exerted by said spring on said plug is transmitted to said stylus in a manner that urges said stylus toward said groove during playback.

3. A system as defined in claim 2 wherein the attachment of said plug to said stylus arm is effected by means including a stylus arm holder having respective apertures in which appropriate ends of said plug and said stylus arm are inserted, and wherein the relative orientation of said apertures in said stylus arm holder is such as to orient said plug substantially perpendicular to said disc surface during playback when said angular orientation of said stylus arm occurs.

4. A system as defined in claim 1 wherein said stylus arm comprises a tubular member, one end of said tubular member being substantially flattened; wherein said stylus is affixed to said flattened end of said tubular member; and wherein said flattened end is oriented relative to said turntable surface in such manner as to permit rotation of said flattened end about an axis of rotation substantially parallel to said turntable surface in response to disc surface undulations during playback.

5. A system as defined in claim 4 wherein said stylus has a conductive surface; wherein said tubular member is formed of conductive material; and wherein said flattened end of said tubular member provides a conductive connection between said stylus surface and the remainder of said tubular member.

6. A system as defined in claim 1 wherein said spring is a generally U-shaped member made of suitable flat resilient material, and wherein one leg of said U-shaped member is inserted into said support member and the other leg terminates in said arcuate plug-engaging surface dimensioned to substantially complement the spring-engaging surface of said plug.

7. A system as defined in claim 6 wherein said support member includes means for preventing tipping of said stylus arm around an imaginary axis formed by a straight line joining the center of said opening in said support member and the point where said stylus engages said spiral groove, said last-named means including two parallel guiding walls separated by a distance slightly greater than the width of said other leg of said spring and permitting smooth sliding engagement with edges of said other leg.

8. A system as defined in claim 6 wherein said spring-engaging surface of said plug is located in the vicinity of said one end of said plug, wherein said plug in said vicinity has a circular cross-section of greater magnitude than said circular cross-section in said remote region, and wherein said arcuate plug-engaging surface of said spring is oriented so that said spring loading of said plug in said tangential-direction is effected (1) without interference with the rotation of said plug and stylus arm about a rotational axis substantially perpendicular to said turntable surface to accommodate disc groove eccentricities, and (2) in a manner permitting facile disassembly of said stylus arm from said stylus arm carrying structure via movement of said plug away from turntable in a direction parallel to said rotational axis.

* * * * *